US011129257B2

(12) United States Patent
Barve et al.

(10) Patent No.: US 11,129,257 B2
(45) Date of Patent: Sep. 21, 2021

(54) SYSTEM FOR DYNAMIC SWITCHING CONTROL OF A LUMINAIRE

(71) Applicant: Appleton Grp LLC, Rosemont, IL (US)

(72) Inventors: Pushkar Satish Barve, Maharashtra (IN); Pankaj Prakashrao Tikle, Maharashtra (IN); Aniket Nitin Mathkari, Maharashtra (IN); Rutuja Vijay Sawant, Maharashtra (IN)

(73) Assignee: Appleton Grp LLC, Rosemont, IL (US)

(*) Notice: Subject to any disclaimer, the term of this patent is extended or adjusted under 35 U.S.C. 154(b) by 0 days.

(21) Appl. No.: 16/939,918

(22) Filed: Jul. 27, 2020

(65) Prior Publication Data

US 2021/0029802 A1   Jan. 28, 2021

(30) Foreign Application Priority Data

Jul. 27, 2019  (IN) .............................. 201921030417

(51) Int. Cl.
*H05B 47/11* (2020.01)
*H05B 47/14* (2020.01)
*F21V 23/04* (2006.01)

(52) U.S. Cl.
CPC .......... *H05B 47/11* (2020.01); *F21V 23/0464* (2013.01); *H05B 47/14* (2020.01)

(58) Field of Classification Search
None
See application file for complete search history.

(56) References Cited

U.S. PATENT DOCUMENTS

| 9,185,777 B2 | 11/2015 | Reed |
| 9,713,228 B2 | 7/2017 | Reed |
| 2020/0236758 A1* | 7/2020 | Lokhande ............ H05B 47/155 |

FOREIGN PATENT DOCUMENTS

WO   2018087709 A1   5/2018

OTHER PUBLICATIONS

Examination Report dated Mar. 5, 2021, issued in corresponding Indian Application No. 201921030417, 6 pages.

* cited by examiner

*Primary Examiner* — Dedei K Hammond
(74) *Attorney, Agent, or Firm* — McDonnell Boehnen Hulbert & Berghoff LLP

(57) ABSTRACT

The present disclosure relates to the field of luminaire control systems and discloses a system (100) for dynamic switching control of a luminaire (116). The system (100) comprises an ambient light sensor (102), an infrared sensor (104), and a control unit (106). The ambient light sensor (102) senses ambient illumination level and generates a light detection signal representative of the sensed ambient illumination level. The infrared sensor (104) senses infrared radiation of ambient light in the vicinity of the luminaire (116) and generates an infrared radiation detection signal. The control unit (106) cooperates with the ambient light sensor (102) and the infrared sensor (104) to generate a control signal for controlling the operation of the luminaire (116). The control unit (106) also updates the pre-determined turn on and turn off threshold lux values based on level of contamination on the surface of the ambient light sensor (102).

10 Claims, 7 Drawing Sheets

SYSTEM FOR DYNAMIC SWITCHING CONTROL OF A LUMINAIRE

CROSS-REFERENCE TO RELATED APPLICATION

The present application claims priority to IN Patent Application No. 201921030417 filed Jul. 27, 2019, the contents of which are hereby incorporated by reference in their entirety.

FIELD

The present disclosure relates to luminaire control systems. More particularly, the present disclosure relates to a system for dynamic switching control of a luminaire.

BACKGROUND

The background information herein below relates to the present disclosure but is not necessarily prior art.

With an increase in a push towards reduction in lighting energy consumption, several methods have been developed to eliminate the use of light sources when they are not needed. For example, most outdoor luminaries now come equipped with a factory-installed photocell which controls the operation of the luminaire based on ambient light intensity. Generally, the photocells measure the intensity of ambient light and are designed to (i) turn on a luminaire at dusk i.e. when the measured light intensity falls below a pre-determined threshold light intensity and (ii) turn off the luminaire at dawn when the measured light intensity exceeds the pre-determined threshold light intensity. The photocells utilize semiconductors to control the flow of electric current through them. When the semiconductors are exposed to a certain level of light, current starts to flow through them and the luminaire is shut off. Some of these photocell sensors allow a user to choose the light level that will activate the semiconductor. As the light fades during the evening, the current flow reduces and stops eventually, causing the luminaire to turn on.

These systems are thus effective in reducing the lighting energy consumption. However, with time, contaminants such as dust, snow, and mud settle on the surface of the photocells. The photocells are generally incapable of detecting such contaminants. The settlement of contaminants on the surface of the photocells causes the light intensity measured by the photocells to be lower than the actual ambient light intensity. This leads to false triggering of the luminaries, which is not desired.

Thus, since the threshold light intensity is constant (factory set), the system turns on the luminaries even when there is sufficient ambient light, thereby leading to wastage of energy. Further, carrying out maintenance and cleaning of such luminaries is also not practical as the photocells may be located at heights ranging from 25 to 40 ft. in the vicinity of the luminaire. Further, if the contamination is more, the systems may keep the luminaries continuously in an on condition. This can cause continuous heating of the luminaries, which can be dangerous especially in hazardous areas.

There is, therefore, felt a need to provide a system which can adjust the threshold light intensity based on the environmental conditions as well as the amount of contamination present on the surface of the photocell.

OBJECTS

Some of the objects of the present disclosure, which at least one embodiment herein satisfies, are as follows:

It is an object of the present disclosure to ameliorate one or more problems of the prior art or to at least provide a useful alternative.

It is an object of the present disclosure to provide a system for dynamic switching control of a luminaire.

Another object of the present disclosure is to provide a system that detects contamination on the surface of the light sensor for facilitating dynamic switching control of the luminaire.

Still another object of the present disclosure is to provide a system for dynamic switching control of a luminaire that uses an ambient light sensor to turn on the luminaire at dusk and turn off the luminaire at dawn.

Yet another object of the present disclosure is to provide a system for dynamic switching control of a luminaire that facilitates correct estimation of turn on and turn off threshold lux levels based on environmental conditions and presence of contamination on the surface of ambient light sensor.

Still another object of the present disclosure is to provide a system for dynamic switching control of a luminaire that eliminates false triggering of the luminaire due to the presence of contaminants on the surface of ambient light sensor.

Yet another object of the present disclosure is to provide a system for dynamic switching control of a luminaire that improves operating efficiency of the luminaire.

Still another object of the present disclosure is to provide a system for dynamic switching control of a luminaire that eliminates the need for manually cleaning the ambient light sensor.

Yet another object of the present disclosure is to provide a system for dynamic switching control of a luminaire that increases operating life of the luminaire.

Still another object of the present disclosure is to provide a system for dynamic switching control of a luminaire that reduces maintenance requirements.

Other objects and advantages of the present disclosure will be more apparent from the following description, which is not intended to limit the scope of the present disclosure.

SUMMARY

The present disclosure envisages a system for dynamic switching control of at least one luminaire. The system comprises an ambient light sensor, an infrared sensor, and a control unit. The ambient light sensor is configured to sense an ambient illumination level, and is further configured to generate a light detection signal representative of the sensed ambient illumination level. The infrared sensor is configured to sense infrared radiation of ambient light in the vicinity of the luminaire, and is further configured to generate an infrared radiation detection signal representative of the sensed infrared radiation of ambient light. The control unit is configured to cooperate with the ambient light sensor and the infrared sensor to receive the light detection signal and the infrared radiation detection signal respectively. The control unit comprises a first repository, a luminaire control module, and a contamination detection module. The first repository is configured to store a pre-determined turn on threshold lux value, a pre-determined turn off threshold lux value, an alarm flag, a threshold alarm flag value, and a pre-defined contamination detection activation threshold. The luminaire control module is configured to cooperate with the first repository to generate a control signal for controlling the operation of the luminaire based on the received light detection signal, the received infrared radiation detection signal, and the pre-determined turn on and turn off threshold lux values. The contamination detection module is configured to cooperate with the first repository and the luminaire control module to update the pre-determined turn on and turn off threshold lux values based on level of contamination on the surface of the ambient light sensor.

In an embodiment, the luminaire control module comprises a signal conditioning unit, a first comparator module, and a first processor. The signal conditioning unit is configured to receive the light detection signal and the infrared radiation detection signal, and is further configured to generate an ambient lux value and an infrared radiation value based on the received light detection signal and infrared radiation detection signal respectively. The first comparator module is configured to cooperate with the signal conditioning unit to receive the ambient lux value, and is further configured to receive the pre-determined turn on and turn off threshold lux values from the first repository. In an embodiment, the first comparator module comprises a first comparator and a second comparator. The first comparator is configured to compare the ambient lux value with the pre-determined turn on threshold lux value, and is further configured to generate a turn on control signal for switching on the luminaire when the ambient lux value is less than the pre-determined turn on threshold lux value. The first comparator is configured to store an infrared radiation value corresponding to the ambient lux value at the turn on of the luminaire in the first repository. The second comparator is configured to compare the ambient lux value with the pre-determined turn off threshold lux value, and is further configured to generate a turn off control signal for switching off the luminaire when the ambient lux value is greater than the pre-determined turn off threshold lux value. The second comparator is configured to store an infrared radiation value corresponding to the ambient lux value at the turn off of the luminaire in the first repository. The first processor is configured to cooperate with the signal conditioning unit to activate the contamination detection module when the ambient lux value becomes less than the pre-defined contamination detection activation threshold.

In an embodiment, the control unit includes an alerting module configured to cooperate with the luminaire control module and the first repository to generate an alert signal when the value stored in the alarm flag becomes equal to the threshold alarm flag value. In an embodiment, the alerting module comprises a second comparator module, a signal generating module, and a resetting module. The second comparator module is configured to receive the ambient lux value and the infrared radiation value from the luminaire control module, and is further configured to increment the alarm flag when the ambient lux value is zero and the infrared radiation value is non-zero for a pre-determined period of time. The signal generating module is configured to generate the alert signal when the value stored in the alarm flag becomes equal to the threshold alarm flag value to alternatively, (i) turn off the luminaire and (ii) trigger a notification unit to notify an operator about a possible hazard. The notification unit is selected from a group consisting of an indicator, a buzzer, an alarm, a speaker, a display device, and a graphical user interface. The resetting module is configured to reset the alarm flag when the ambient lux value becomes greater than the pre-determined threshold lux value.

In an embodiment, the contamination detection module comprises a first computation module, a second repository, and a second computation module. The first computation module is configured to receive ambient lux value and infrared radiation value from the luminaire control module, and is further configured to compute a ratio of the received ambient lux value and infrared radiation value. The second repository is configured to cooperate with the first computation module to store the computed ratios. The second computation module is configured to cooperate with the second repository to receive the computed ratios and radiation values corresponding to turn on and turn off of the luminaire. The second computation module comprises an averaging module and a threshold calculator. The averaging module is configured to compute a moving average of the received ratios over a pre-determined time interval. The threshold calculator is configured to cooperate with the averaging module to compute new turn on and turn off threshold lux values based on the computed average ratio and the infrared radiation value. The threshold calculator is further configured to update the pre-determined turn on and turn off threshold lux values with the new turn on and turn off threshold lux values in the first repository.

Advantageously, the ambient light sensor is a dawn to dusk photocell sensor.

The present disclosure also envisages a method for dynamic switching control of a luminaire. The method includes the following steps:

1. sensing, by an ambient light sensor, an ambient illumination level;
2. generating, by the ambient light sensor, a light detection signal representative of the sensed ambient illumination level;
3. sensing, by an infrared sensor, infrared radiation of ambient light in the vicinity of the luminaire;
4. generating, by the infrared sensor, an infrared radiation detection signal representative of the sensed infrared radiation of ambient light;
5. storing, in a first repository of a control unit, a pre-determined turn on threshold lux value, a pre-determined turn off threshold lux value, an alarm flag, a threshold alarm flag value, and a pre-defined contamination detection activation threshold;
6. receiving, by a luminaire control module of the control unit, the light detection signal and the infrared radiation detection signal from the ambient light sensor and the infrared sensor respectively;
7. generating, by the luminaire control module, a control signal for controlling the luminaire based on the received light detection signal, the received infrared radiation detection signal, and the pre-determined turn on and turn off threshold lux values; and
8. updating, by a contamination detection module of the control unit, the pre-determined turn on and turn off threshold lux values based on a level of contamination on the surface of the luminaire.

BRIEF DESCRIPTION OF THE ACCOMPANYING DRAWING

A system for dynamic switching control of a luminaire of the present disclosure will now be described with the help of the accompanying drawing, in which.

LIST OF REFERENCE NUMERALS

100—System
102—Ambient light sensor
104—Infrared sensor
106—Control unit
108—First repository
110—Luminaire control module
112—Contamination detection module
114—Alerting module
116—Luminaire
202—Signal conditioning unit
204—First comparator module
206—First comparator
208—Second comparator
210—First processor
302—First computation module
304—Second repository
306—Second computation module
308—Averaging module
310—Threshold calculator
402—Second comparator module
404—Signal generating module
406—Resetting module
408—Notification unit

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, steps, operations, elements, modules, units and/or components, but do not forbid the presence or addition of one or more other features, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, or section from another element, component, or section. Terms such as first, second, third etc., when used herein do not imply a specific sequence or order unless clearly suggested by the present disclosure.

A system for dynamic switching control of at least one luminaire (hereinafter referred as "system 100"), of the present disclosure, is now being described with reference to FIG. 1 through FIG. 7.

Figure 1:
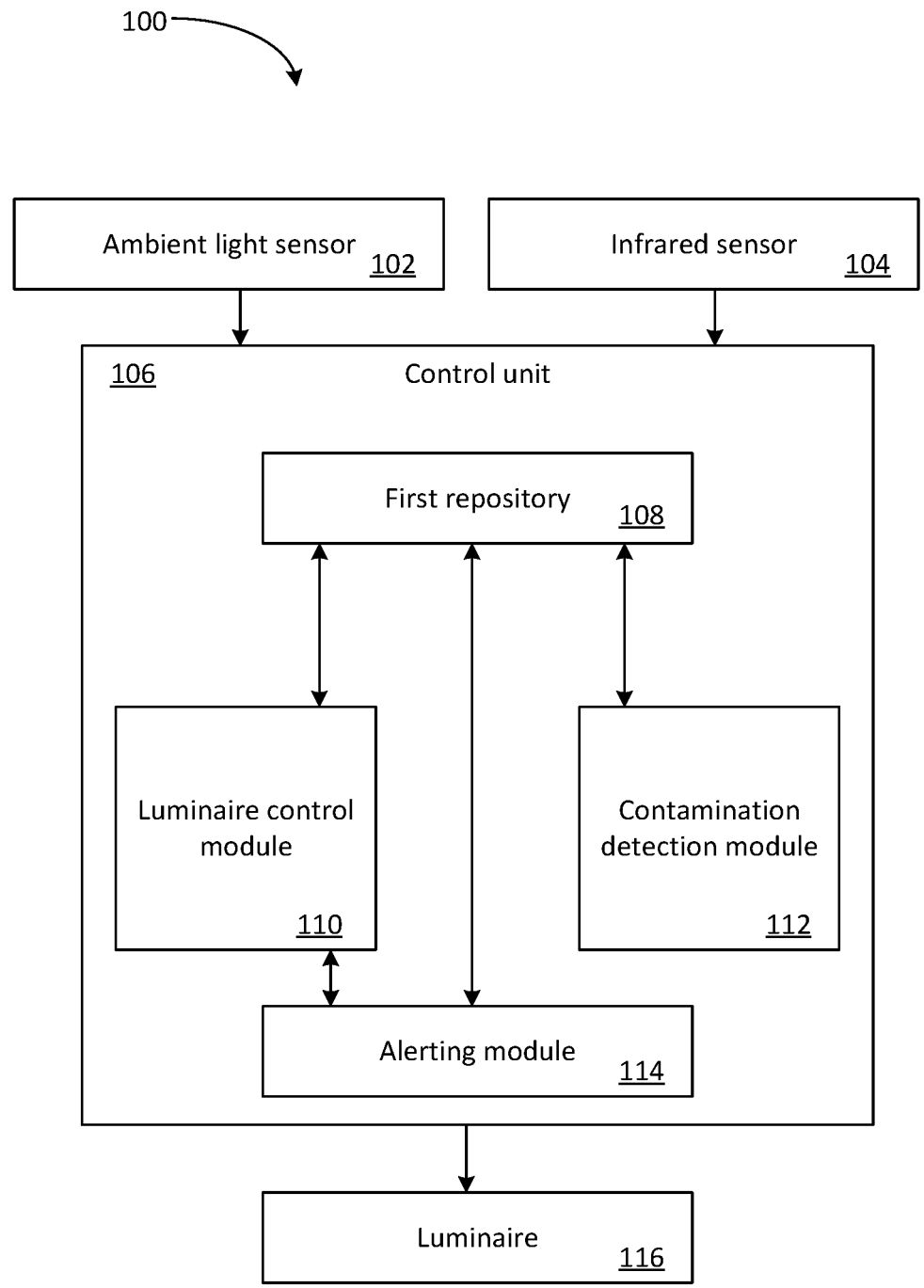
FIG. 1 illustrates a block diagram of a system for dynamic switching control of a luminaire.

Referring to FIG. 1, the system 100 comprises an ambient light sensor 102, an infrared sensor 104, and a control unit 106. The ambient light sensor 102 is configured to sense an ambient illumination level, and is further configured to generate a light detection signal representative of the sensed ambient illumination level. The light detection signal may be an analog signal or a digital signal. The infrared sensor 104 is configured to sense infrared radiation of ambient light in the vicinity of the luminaire 116, and is further configured to generate an infrared radiation detection signal representative of the sensed infrared radiation of ambient light. The infrared radiation detection signal may be an analog signal or a digital signal. The ambient light sensor 102 responds to light in the visible spectrum, specifically from 400 nm to 700 nm. The infrared sensor 104 responds to radiation between 700 nm to 1100 nm. In an embodiment, the infrared sensor 104 has a peak sensitivity at 890 nm. The control unit 106 is configured to cooperate with the ambient light sensor 102 and the infrared sensor 104 to receive the light detection signal and the infrared radiation detection signal respectively. The control unit 106 comprises a first repository 108, a luminaire control module 110, and a contamination detection module 112. The first repository 108 is configured to store a pre-determined turn on threshold lux value, a pre-determined turn off threshold lux value, an alarm flag, a threshold alarm flag value, and a pre-defined contamination detection activation threshold. The luminaire control module 110 is configured to cooperate with the first repository 108 to generate a control signal for controlling the operation of the luminaire 116 based on the received light detection signal, the received infrared radiation detection signal, and the pre-determined turn on and turn off threshold lux values. The contamination detection module 112 is configured to cooperate with the first repository 108 and the luminaire control module 110 to update the pre-determined turn on and turn off threshold lux values based on level of contamination on the surface of the ambient light sensor 102. In an embodiment, the ambient light sensor 102 and the infrared sensor 104 are configured to continuously sense the ambient illumination level and the infrared radiation respectively. In another embodiment, the control unit 106 is configured to allow the ambient light sensor 102 and the infrared radiation sensor 104 to periodically sense the ambient illumination level and the infrared radiation respectively.

Figure 2:
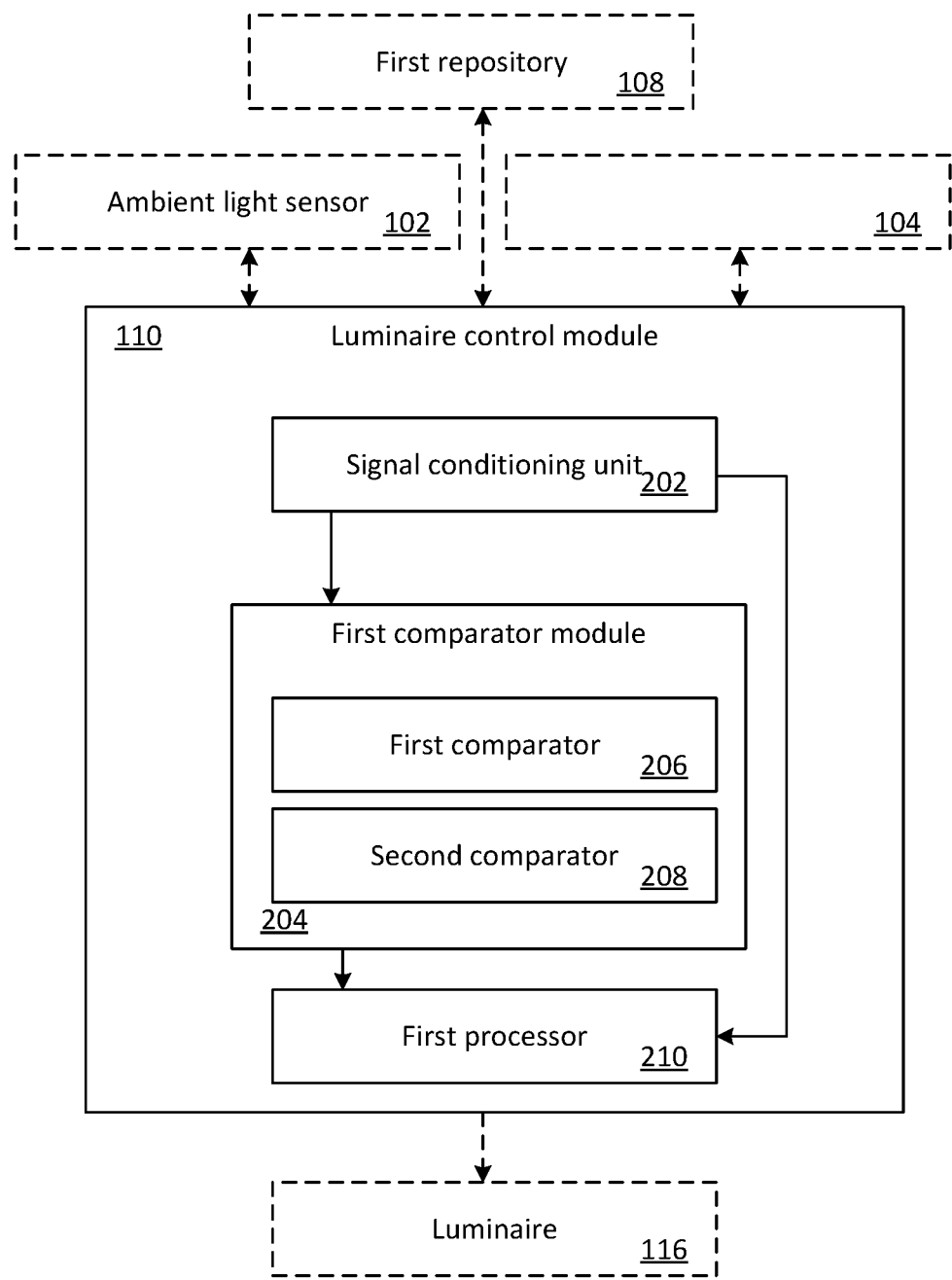
FIG. 2 illustrates a block diagram of a luminaire control module of the system of FIG. 1.

In an embodiment of FIG. 2, the luminaire control module 110 comprises a signal conditioning unit 202, a first comparator module 204, and a first processor 210. The signal conditioning unit 202 is configured to receive the light detection signal and the infrared radiation detection signal, and is further configured to generate an ambient lux value and an infrared radiation value based on the received light detection signal and infrared radiation detection signal respectively. The first comparator module 204 is configured to cooperate with the signal conditioning unit 202 to receive the ambient lux value, and is further configured to receive the pre-determined turn on and turn off threshold lux values from the first repository 108. In an embodiment, the first comparator module 204 comprises a first comparator 206 and a second comparator 208. The first comparator 206 is configured to compare the ambient lux value with the pre-determined turn on threshold lux value, and is further configured to generate a turn on control signal for switching on the luminaire 116 when the ambient lux value is less than the pre-determined turn on threshold lux value. The first comparator 206 is configured to store an infrared radiation value corresponding to the ambient lux value at the turn on of the luminaire 116 in the first repository 108. The second comparator 208 is configured to compare the ambient lux value with the pre-determined turn off threshold lux value, and is further configured to generate a turn off control signal for switching off the luminaire 116 when the ambient lux value is greater than the pre-determined turn off threshold lux value. The second comparator 208 is configured to store an infrared radiation value corresponding to the ambient lux value at the turn off of the luminaire 116 in the first repository 108. The first processor 210 is configured to cooperate with the signal conditioning unit 202 to activate the contamination detection module 112 when the ambient lux value becomes less than the pre-defined contamination detection activation threshold.

In an embodiment, the control unit 106 includes an alerting module 114 configured to cooperate with the luminaire control module 110 and the first repository 108 to generate an alert signal when the value stored in the alarm flag becomes equal to the threshold alarm flag value. Referring to an embodiment of FIG. 4, the alerting module 114 comprises a second comparator module 402, a signal generating module 404, and a resetting module 406. The second comparator module 402 is configured to receive the ambient lux value and the infrared radiation value from the luminaire control module 110, and is further configured to increment the alarm flag when the ambient lux value is zero and the infrared radiation value is non-zero for a pre-determined period of time. The signal generating module 404 is configured to generate the alert signal when the value stored in the alarm flag becomes equal to the threshold alarm flag value to alternatively, (i) turn off the luminaire 116 and (ii) trigger a notification unit 408 to notify an operator about a possible hazard. The notification unit 408 is selected from a group consisting of an indicator, a buzzer, an alarm, a speaker, a display device, and a graphical user interface. The resetting module 406 is configured to reset the alarm flag when the ambient lux value becomes greater than the pre-determined threshold lux value.

Figure 3:
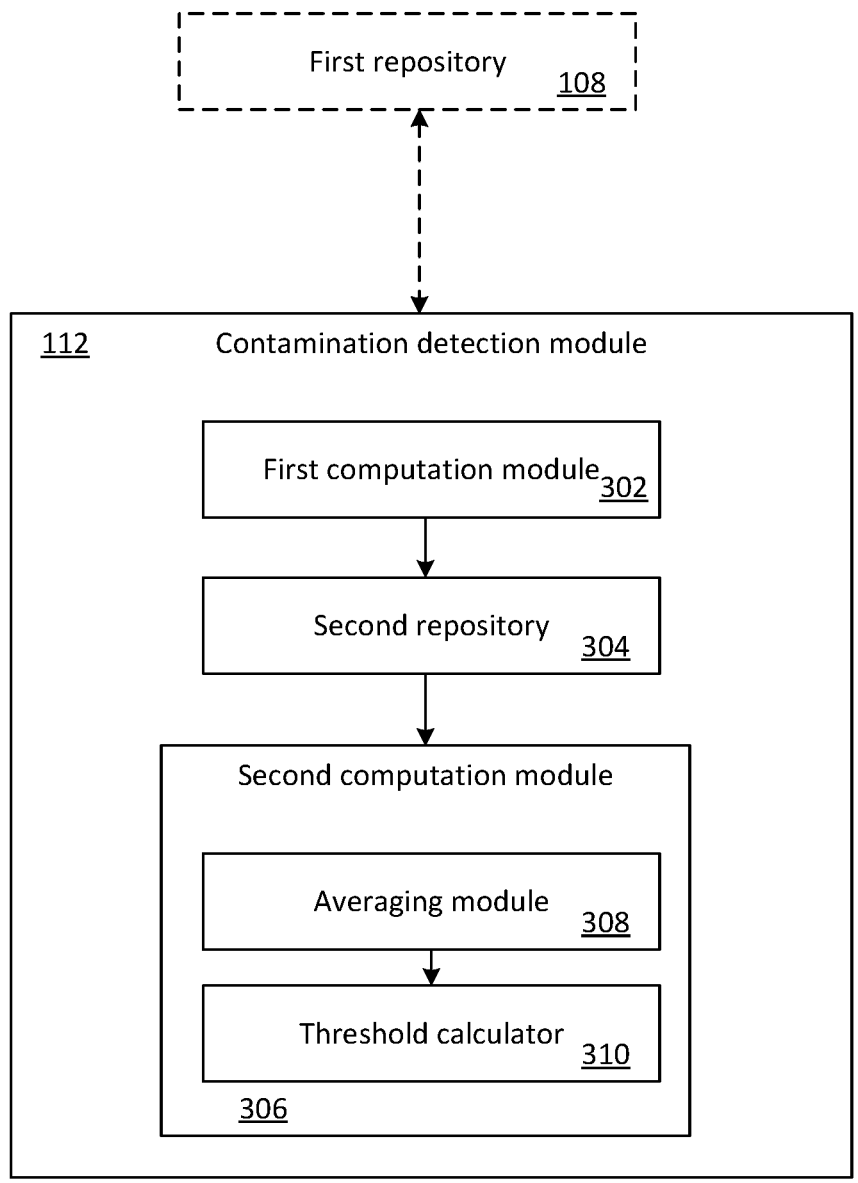
FIG. 3 illustrates a block diagram of a contamination detection module of the system of FIG. 1.
Figure 4:
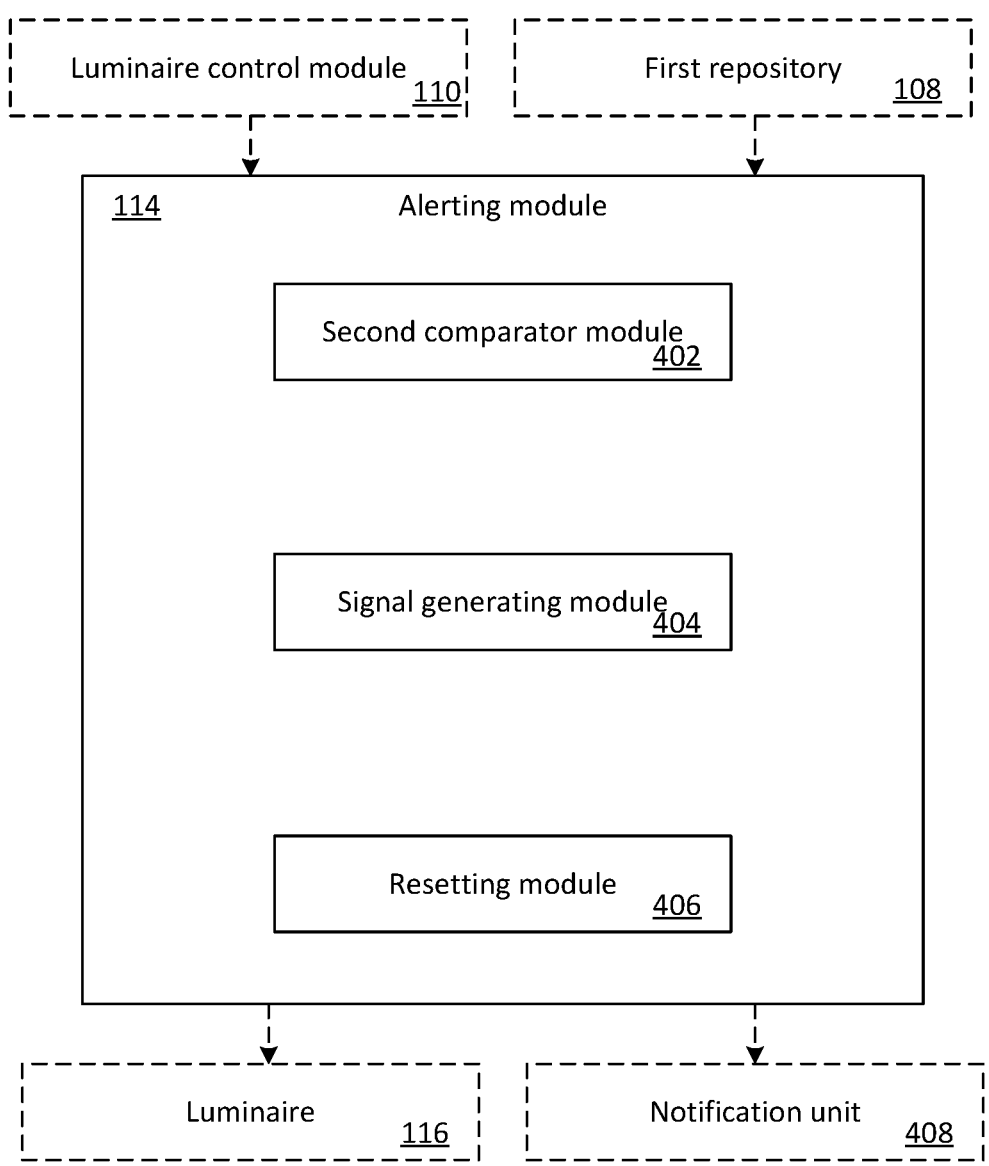
FIG. 4 illustrates a block diagram of an alerting module of the system of FIG. 1.

In an embodiment of FIG. 3, the contamination detection module 112 comprises a first computation module 302, a second repository 304, and a second computation module 306. The first computation module 302 is configured to receive an ambient lux value and an infrared radiation value from the luminaire control module 110, and is further configured to compute a ratio of the received ambient lux value and infrared radiation value. The second repository 304 is configured to cooperate with the first computation module 302 to store the computed ratios. The second computation module 306 is configured to cooperate with the second repository 304 to receive the computed ratios and infrared radiation values corresponding to turn on and turn off of the luminaire 116. The second computation module 306 comprises an averaging module 308 and a threshold calculator 310. The averaging module 308 is configured to compute a moving average of the received ratios over a pre-determined time interval. The threshold calculator 310 is configured to cooperate with the averaging module 308 to compute new turn on and turn off threshold lux values based on the computed average ratio and the infrared radiation value. The threshold calculator 310 is further configured to update the pre-determined turn on and turn off threshold lux values with the new turn on and turn off threshold lux values in the first repository 108.

Advantageously, the ambient light sensor 102 is a dawn to dusk photocell sensor.

Figure 5:
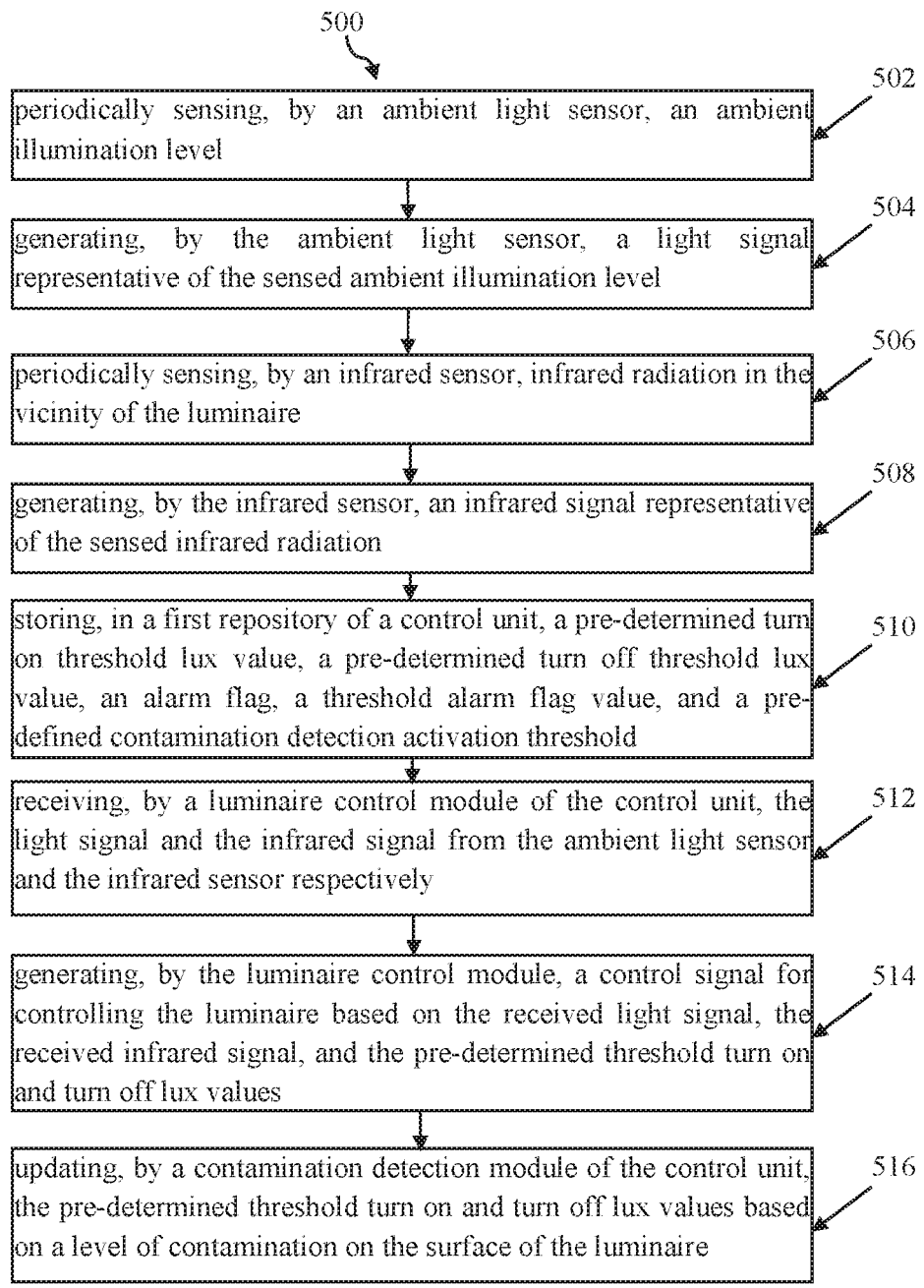
FIG. 5 illustrates a flow diagram depicting a method for dynamic switching control of a luminaire.

Referring to FIG. 5, the present disclosure also envisages a method 500 for dynamic switching control of a luminaire 116. The method includes the following steps:

STEP 502: sensing, by an ambient light sensor 102, an ambient illumination level;

STEP 504: generating, by the ambient light sensor 102, a light detection signal representative of the sensed ambient illumination level;

STEP 506: sensing, by an infrared sensor 104, infrared radiation of ambient light in the vicinity of the luminaire 116;

STEP 508: generating, by the infrared sensor 104, an infrared radiation detection signal representative of the sensed infrared radiation of ambient light;

STEP 510: storing, in a first repository 108 of a control unit 106, a pre-determined turn on threshold lux value, a pre-determined turn off threshold lux value, an alarm flag, a threshold alarm flag value, and a pre-defined contamination detection activation threshold;

STEP 512: receiving, by a luminaire control module 110 of the control unit 106, the light detection signal and the infrared radiation detection signal from the ambient light sensor 102 and the infrared sensor 104 respectively;

STEP 514: generating, by the luminaire control module 110, a control signal for controlling the luminaire 116 based on the received light detection signal, the received infrared radiation detection signal, and the pre-determined turn on and turn off threshold lux values; and STEP 516: updating, by a contamination detection module 112 of the control unit 106, the pre-determined turn on and turn off threshold lux values based on a level of contamination on the surface of the luminaire 116.

An exemplified pseudocode for implementing the method 500 for dynamic switching control of a luminaire 116 is given below:

```
Begin
    Read_Ambient_Lux_Value( );
    Read_IR_Radiation_Value( );
    If (Ambient_Lux_Value <Turn_ON_Threshold_Lux_Value)
    {
        Turn_ON_Luminaire( );
        Store_IR_Count_at_Lumin_Turn_ON( );
    }
    If (Ambient_Lux_Value>Turn_OFF_Threshold_Lux_Value)
    {
        Turn_OFF_Luminaire( );
        Store_IR_Count_at_Lumin_Turn_OFF( );
    }
```

```
If(Ambient_Lux_Value<Contamination_Detection_Activation_Threshold)
{
    Start_Computing_Light/IR_ratio( );
    Store_Light/IR_ratio( );
}
If (Number_of_days > Nth day)
{
    Update_Thresholds( );
}
```

Figure 6:
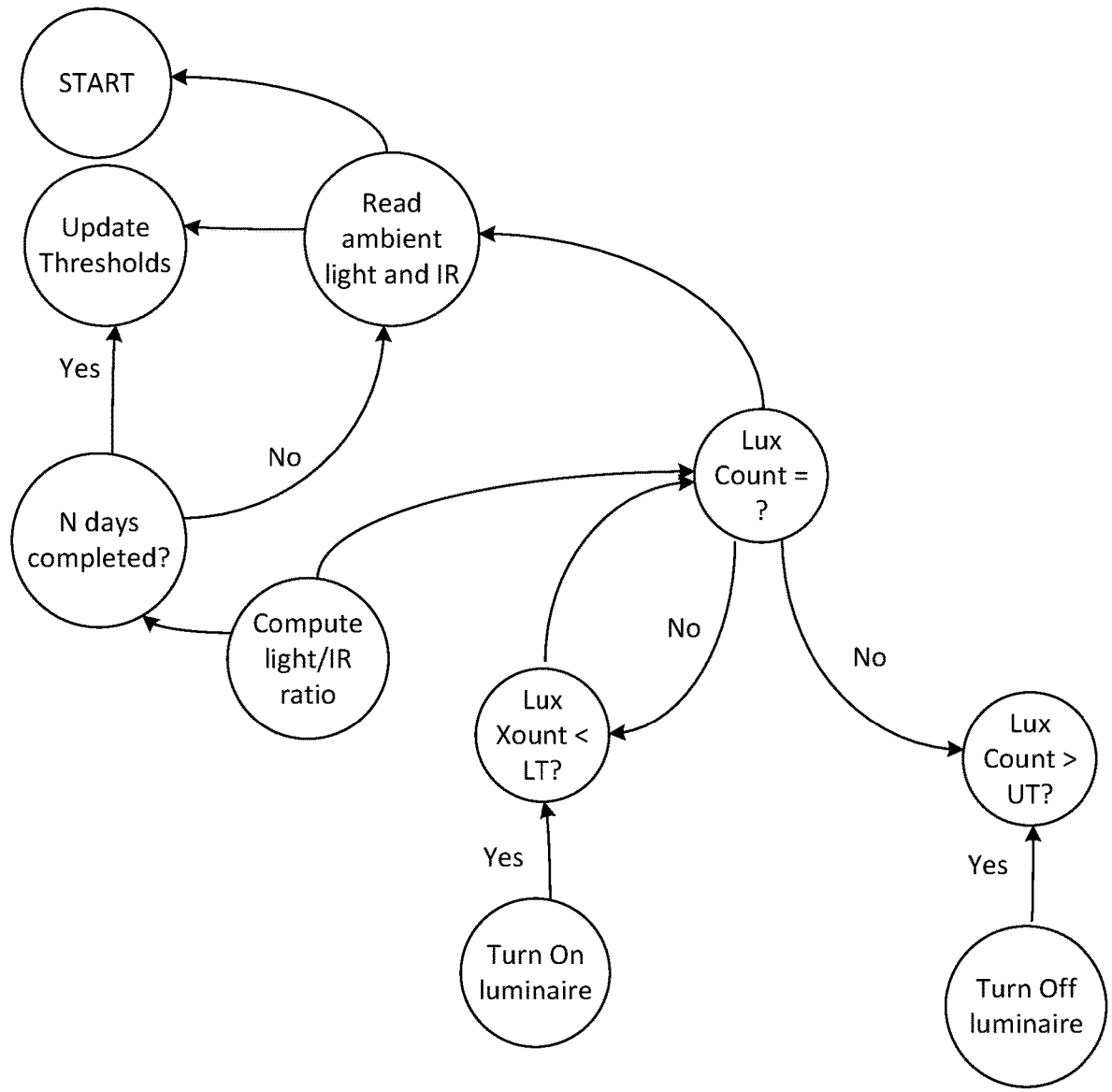
FIG. 6 illustrates a state transition diagram depicting the method of FIG. 5.

FIG. 6 depicts a state transition diagram of the method 500 for dynamic control of a luminaire 116. With reference to FIG. 6, in an exemplary embodiment, the control unit 106 cooperates with an ambient light sensor 102 and an infrared sensor 104 to read ambient light and infrared radiation. The control unit 106 then computes an ambient lux value. If the ambient lux value is less than a pre-determined turn ON threshold lux value, the control unit 106 generates a turn on control signal for turning on the luminaire 116. Similarly, if the ambient lux value is less than a pre-determined turn OFF threshold lux value, the control unit 106 generates a turn off control signal for turning off the luminaire 116. Simultaneously, when the ambient lux value falls below a pre-determined contamination detection activation threshold (say 2000 lux), the control unit 106 starts computing an ambient lux/infrared radiation ratio for a pre-determined number of days (for example 15 days). The control unit 106 computes a moving average of the computed ratios over the pre-determined number of days. Thus, if first average ratio is determined over first 15 days i.e. from $1^{st}$ day to $15^{th}$ day, the next average ratio will be determined over consecutive 15 days, i.e. from $2^{nd}$ day to $16^{th}$ day. The same process continues for a pre-determined time interval. The change in the moving average ratio over the pre-determined time interval indicates contamination on the surface of the ambient light sensor 102. To avoid false triggering of the luminaire 116 due to contamination, the control unit 106 updates the pre-determined turn ON and turn OFF threshold lux values based on the computed moving averages and infrared radiation values at turn on and turn off of the luminaire 116.

In an embodiment, the method 500 includes activating, by the luminaire control module 110, the contamination detection module 112 when the ambient lux value becomes less than the pre-defined contamination detection activation threshold.

Advantageously, the method 500 includes generating, by an alerting module 114 of the control unit 106, an alert signal when the value stored in the alarm flag becomes equal to the threshold alarm flag value.

An exemplified pseudocode for implementing the step of generating the alert signal is given below:

```
Read_Ambient_Lux_Value( );
    If ((Morning) && (Ambient_Lux_Value == 0))
    {
        Alarm_flag++;
    }
    If (Ambient_Lux_Value>Turn_OFF_Threshold_Lux_Value)
    {
        Turn_OFF_Luminaire( );
        Clear_Alarm_flag( );
    }
    If (Alarm_flag == Pre-defined threshold alarm flag value)
    {
```

```
        Generating_Alert_Signal( );
        Turn_OFF_Luminaire( );
    }
```

Figure 7:
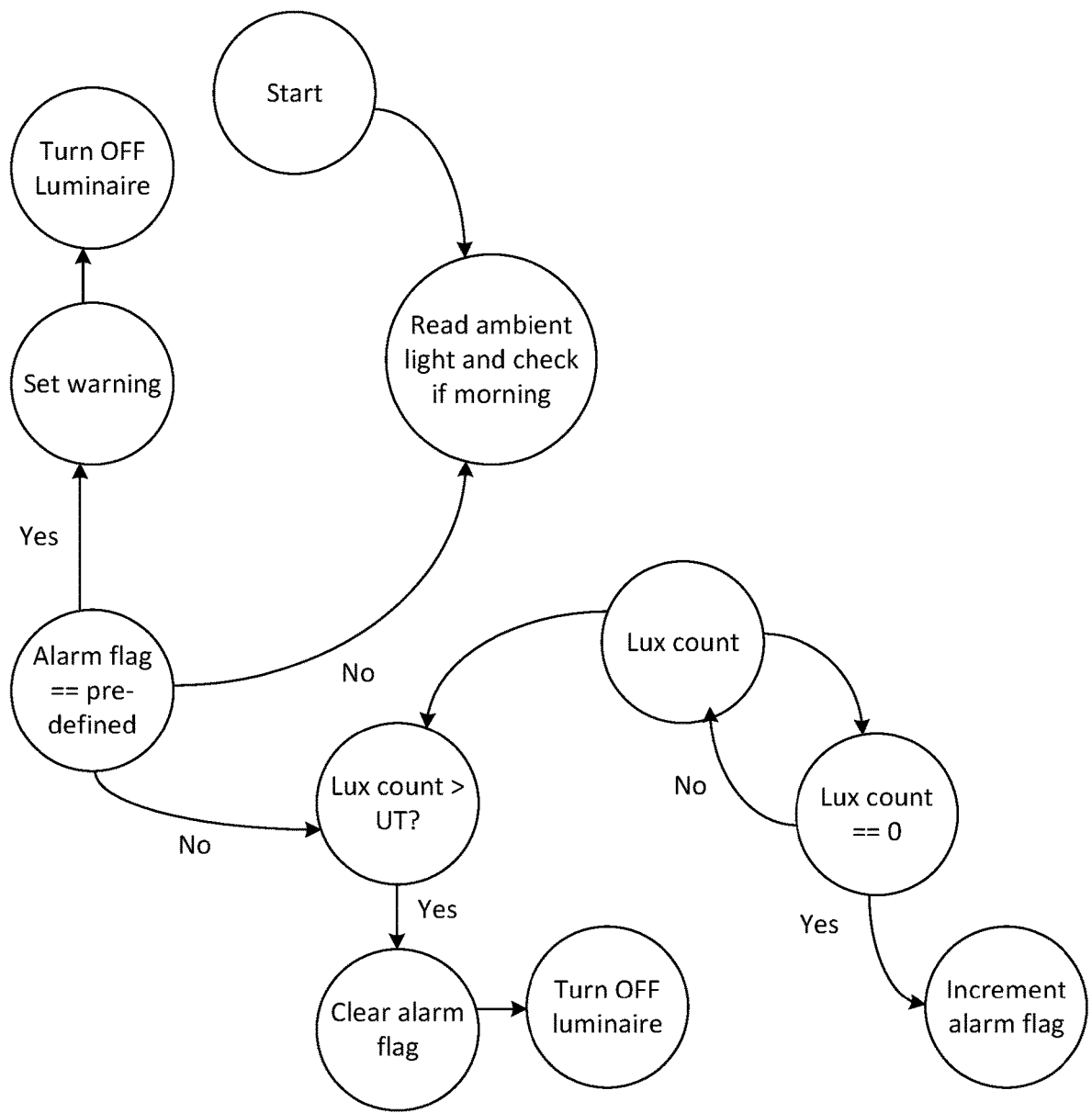
FIG. 7 illustrates a state transition diagram depicting generation of an alert signal of the method of FIG. 5.

FIG. 7 depicts a state transition diagram for generating an alert signal of the method 500 for dynamic control of a luminaire 116. With reference to FIG. 7, in an exemplary embodiment, the control unit 106 cooperates with an ambient light sensor 102 to read ambient light and cooperates with the infrared sensor 104 to determine whether it is morning or not. The control unit 106 then computes an ambient lux value. If the ambient lux value is zero for a pre-determined amount of time, the control unit 106 increments an alarm flag by one. Similarly, if the ambient lux value is greater than the pre-determined turn OFF threshold lux value, the control unit 106 clears the alarm flag and generates a turn off control signal for turning off the luminaire 116. If the ambient lux value is neither zero nor greater than the pre-determined turn OFF threshold lux value, the control unit 106 checks the value stored in the alarm flag. If the value becomes equal to a threshold alarm flag value, the control unit 106 generates an alert signal to notify an operator about a possible hazard and to turn off the luminaire 116.

The system 100 and method 500 of the present disclosure takes into consideration environmental conditions and contamination on the surface of ambient light sensor 102 for correct estimation of a turn on threshold and a turn off lux level. This eliminates false triggering of the luminaire 116 due to the presence of contaminants like dust, snow, and/or dirt on the surface of ambient light sensor 102. Thus, energy consumption and cost of energy consumption is drastically reduced.

The system 100 of the present disclosure was used for dynamic control of a 150 W and a 300 W area master luminaire and corresponding energy saving calculations were performed. It was found that, the system 100 resulted in a savings of 75 Wh per day in the 150 W luminaire and a savings of 150 Wh per day in the 300 W luminaire. These savings increase manifold over time, especially when the system 100 is employed on a large scale.

Another advantage of the system 100 of the present disclosure is that the operators are not required to manually clean the ambient light sensor 102 because of automatic learning and correction of threshold lux values based on the presence of contamination on the surface of luminaries 116. As a result, the operating efficiency and life of the luminaries 116 is improved.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a system for dynamic switching control of a luminaire that:
  facilitates correct estimation of turn on and turn off threshold lux levels by taking environmental conditions and contamination on the surface of ambient light sensor into consideration;
  eliminates false triggering of the luminaire due to the presence of contaminants on the surface of ambient light sensor;
  is energy saving;
  improves operating efficiency of the luminaire;
  eliminates the need for manually cleaning the ambient light sensor;
  increases operating life of the luminaire; and
  reduces maintenance requirements.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A system for dynamic switching control of at least one luminaire, said system comprising:
   i. an ambient light sensor configured to sense an ambient illumination level, and further configured to generate a light detection signal representative of said sensed ambient illumination level;
   ii. an infrared sensor configured to sense infrared radiation of ambient light in the vicinity of said luminaire, and further configured to generate an infrared radiation detection signal representative of said sensed infrared radiation of ambient light; and
   iii. a control unit connected to said ambient light sensor and said infrared sensor to receive said light detection signal and said infrared radiation detection signal respectively, said control unit comprising:
      a first repository configured to store a pre-determined turn on threshold lux value, a pre-determined turn off threshold lux value, an alarm flag, a threshold alarm flag value, and a predefined contamination detection activation threshold;
      a luminaire control module connected to said first repository to generate a control signal for controlling the operation of said luminaire based on said received light detection signal, said received infrared radiation detection signal, and said pre-determined turn on and turn off threshold lux values; and
      a contamination detection module connected to said first repository and said luminaire control module to update said pre-determined turn on and turn off threshold lux values based on level of contamination on the surface of said ambient light sensor.

2. The system as claimed in claim 1, wherein said luminaire control module comprises:
   i. a signal conditioning unit configured to receive said light detection signal and said infrared radiation detection signal, and further configured to generate an ambient lux value and an infrared radiation value based on said received light detection signal and infrared radiation detection signal respectively;
   ii. a first comparator module connected to said signal conditioning unit to receive said ambient lux value, and further configured to receive said pre-determined turn on and turn off threshold lux values from said first repository, said first comparator module comprising:
      a first comparator configured to compare said ambient lux value with said pre-determined turn on threshold lux value, and further configured to generate a turn on control signal for switching on said luminaire when said ambient lux value is less than said pre-determined turn on threshold lux value, said first comparator configured to store an infrared radiation value corresponding to said ambient lux value at the turn on of said luminaire in said first repository; and
      a second comparator configured to compare said ambient lux value with said pre-determined turn off threshold lux value, and further configured to generate a turn off control signal for switching off said luminaire when said ambient lux value is greater than said pre-determined turn off threshold lux value, said second comparator configured to store an infrared radiation value corresponding to said ambient lux value at the turn off of said luminaire in said first repository, and iii. a first processor connected to said signal conditioning unit to activate said contamination detection module when said ambient lux value becomes less than said pre-defined contamination detection activation threshold.

3. The system as claimed in claim 2, wherein said control unit includes an alerting module connected to said luminaire control module and said first repository to generate an alert signal when the value stored in said alarm flag becomes equal to said threshold alarm flag value.

4. The system as claimed in claim 3, wherein said alerting module (114) comprises:

i. a second comparator module configured to receive said ambient lux value and said infrared radiation value from said luminaire control module, and further configured to increment said alarm flag when said ambient lux value is zero and said infrared radiation value is non-zero for a pre-determined period of time;

ii. a signal generating module configured to generate said alert signal when the value stored in said alarm flag becomes equal to said threshold alarm flag value to alternatively:
turn off said luminaire; and
trigger a notification unit to notify an operator about a possible hazard, and iii. a resetting module configured to reset said alarm flag when said ambient lux value becomes greater than said pre-determined threshold lux value.

5. The system as claimed in claim 4, wherein said notification unit is selected from a group consisting of an indicator, a buzzer, an alarm, a speaker, a display device, and a graphical user interface.

6. The system as claimed in claim 2, wherein said contamination detection module includes:

i. a first computation module configured to receive an ambient lux value and an infrared radiation value from said luminaire control module and further configured to compute a ratio of said received ambient lux value and infrared radiation value;

ii. a second repository connected to said first computation module to store said computed ratios; and 111. a second computation module connected to said second repository to receive said computed ratios and infrared radiation values corresponding to turn on and turn off of said luminaire, said second computation module comprising:

iv. an averaging module configured to compute a moving average of said received ratios over a pre-determined time interval; and v. a threshold calculator connected to said averaging module to compute new turn on and turn off threshold lux values based on said computed average ratio and said infrared radiation value, and further configured to update said pre-determined turn on and turn off threshold lux values with said new turn on and turn off threshold lux values in said first repository.

7. The system as claimed in claim 1, wherein said ambient light sensor is a dawn to dusk photocell sensor.

8. A method for dynamic switching control of at least one luminaire, said method comprising the following steps:

i. sensing, by an ambient light sensor, an ambient illumination level;

ii. generating, by said ambient light sensor, a light detection signal representative of said sensed ambient illumination level;

iii. sensing, by an infrared sensor, infrared radiation of ambient light in the vicinity of said luminaire;

iv. generating, by said infrared sensor, an infrared radiation detection signal representative of said sensed infrared radiation of ambient light;

v. storing, in a first repository of a control unit, a predetermined turn on threshold lux value, a pre-determined turn off threshold lux value, an alarm flag, a threshold alarm flag value, and a pre-defined contamination detection activation threshold;

vi. receiving, by a luminaire control module of said control unit, said light detection signal and said infrared radiation detection signal from said ambient light sensor and said infrared sensor respectively;

vii. generating, by said luminaire control module, a control signal for controlling said luminaire based on said received light detection signal, said received infrared radiation detection signal, and said pre-determined turn on and turn off threshold lux values; and viii. updating, by a contamination detection module of said control unit, said pre-determined turn on and turn off threshold lux values based on level of contamination on the surface of said luminaire.

9. The method as claimed in claim 8, wherein said method includes generating, by an alerting module (114) of said control unit, an alert signal when the value stored in said alarm flag becomes equal to said threshold alarm flag value.

10. The method as claimed in claim 8, wherein said method includes activating, by said luminaire control module, said contamination detection module when said ambient lux value becomes less than said pre-defined contamination detection activation threshold.

* * * * *